(12) United States Patent
Zanotti

(10) Patent No.: US 7,114,641 B2
(45) Date of Patent: Oct. 3, 2006

(54) DRIP RESISTANT DISPENSING NOZZLE

(75) Inventor: Jason B. Zanotti, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 375 days.

(21) Appl. No.: 10/666,992

(22) Filed: Sep. 19, 2003

(65) Prior Publication Data

US 2005/0061830 A1   Mar. 24, 2005

(51) Int. Cl.
*G01F 11/00* (2006.01)
(52) U.S. Cl. .................... 222/571; 222/527; 222/1
(58) Field of Classification Search ........... 222/527, 222/571
See application file for complete search history.

(56) References Cited

U.S. PATENT DOCUMENTS

| 2,202,459 | A | * | 5/1940 | Link ..................... 141/382 |
| 4,574,720 | A | * | 3/1986 | Lepisto ................. 141/10 |
| 4,709,836 | A | * | 12/1987 | Andersen ............... 222/490 |
| 5,105,997 | A | * | 4/1992 | Wakabayashi et al. ...... 222/494 |

\* cited by examiner

*Primary Examiner*—J. Casimer Jacyna
(74) *Attorney, Agent, or Firm*—Schwabe, Williamson & Wyatt, P.C.

(57) ABSTRACT

A dispensing nozzle method and apparatus is provided that may help in reducing the number of defects in integrated circuits during the manufacturing process. In one embodiment, the nozzle is configured such that at least a portion of the end of the nozzle that dispenses fluid can increase and decrease with a change in pressure, which may help to control fluid drips when the nozzle is not dispensing.

19 Claims, 4 Drawing Sheets

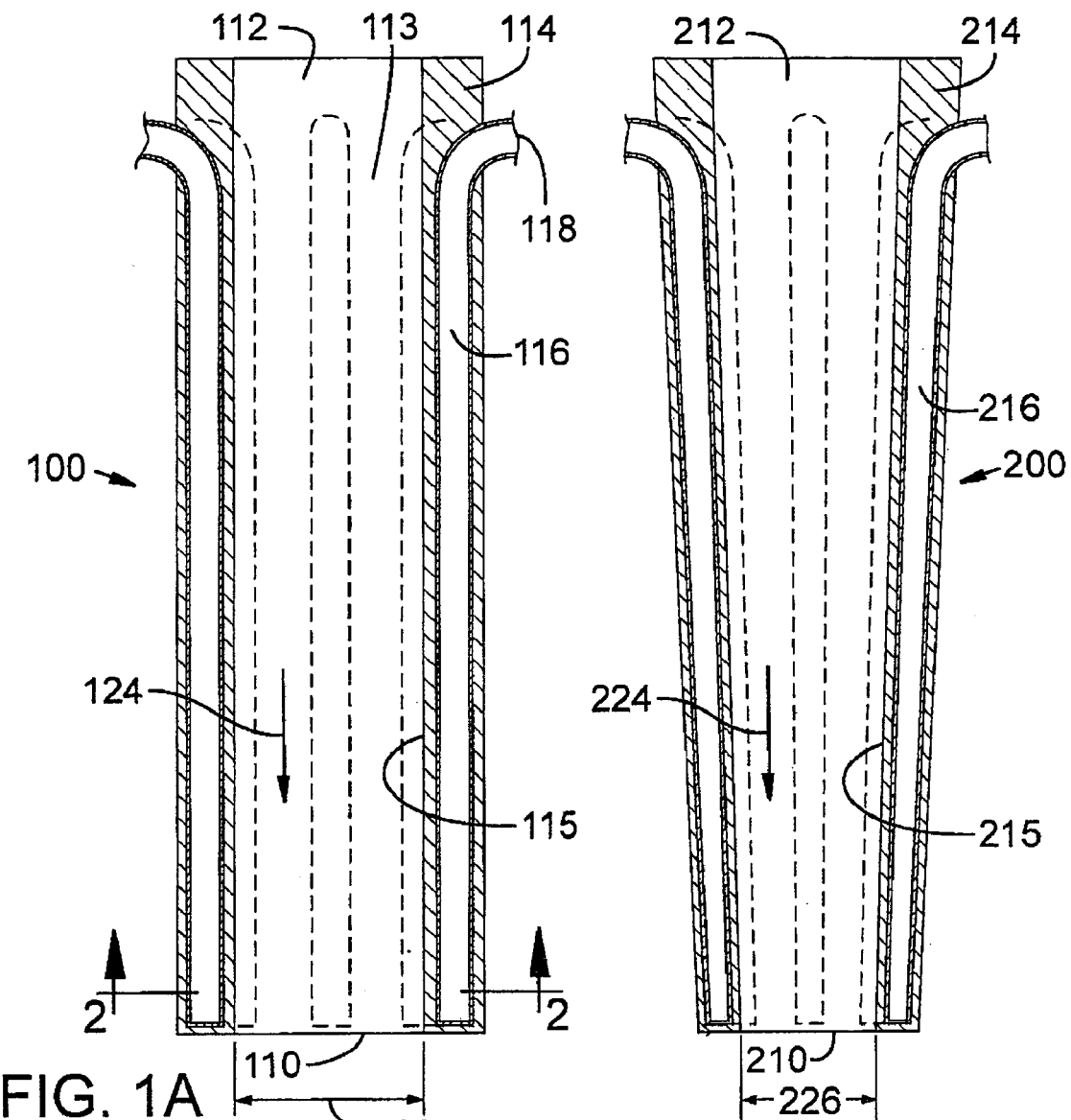
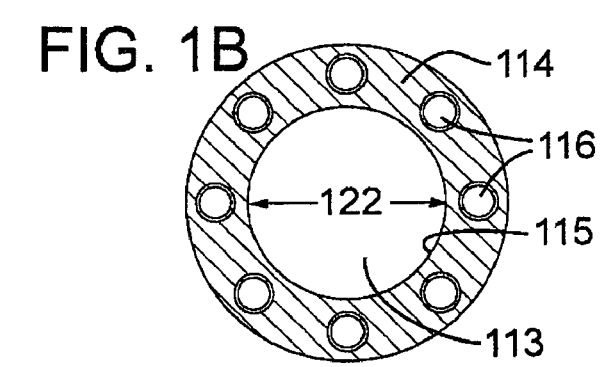
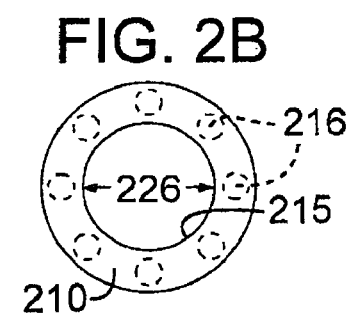

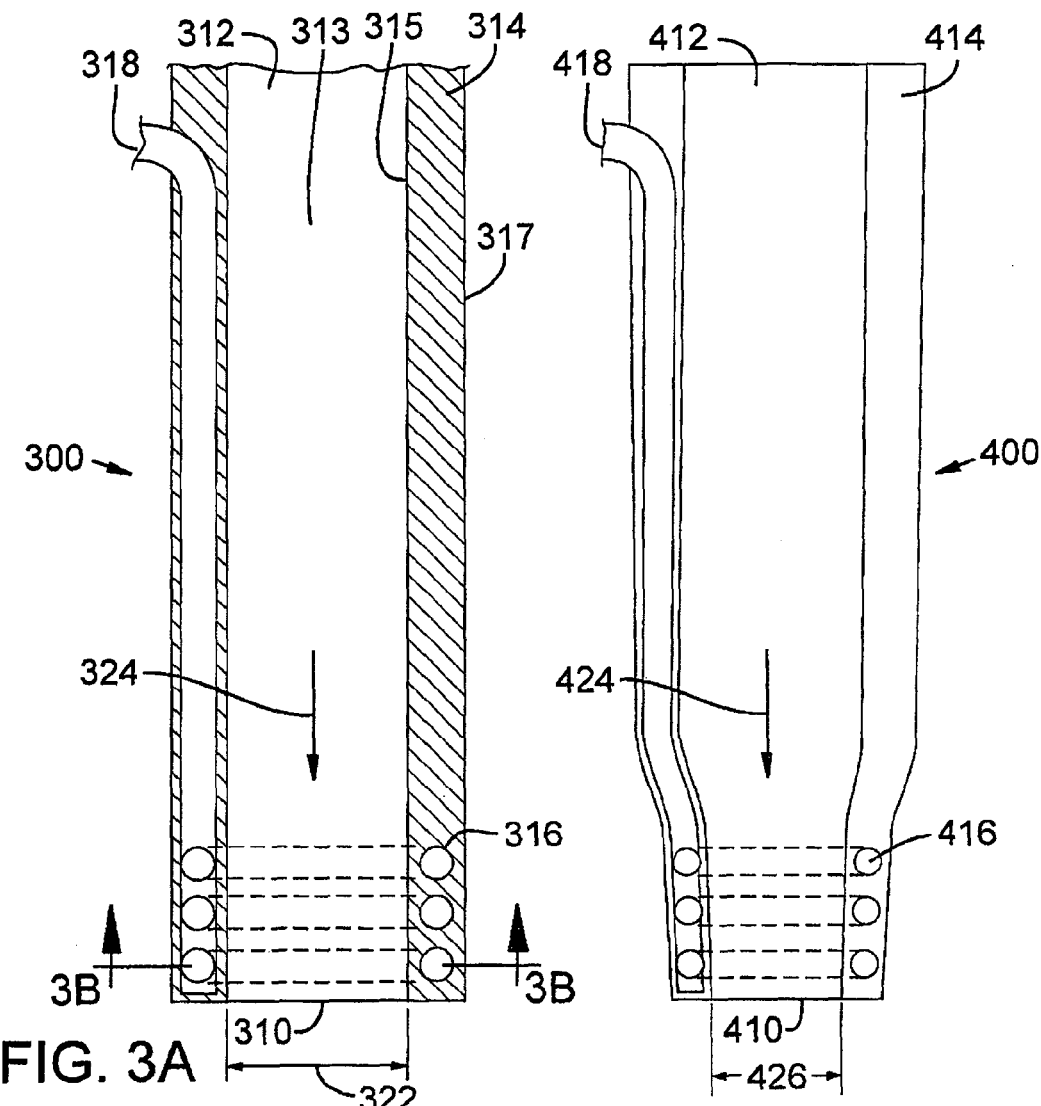

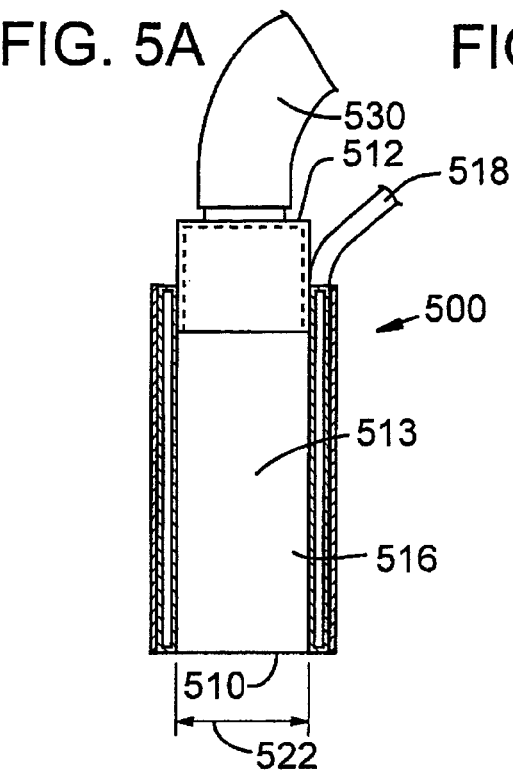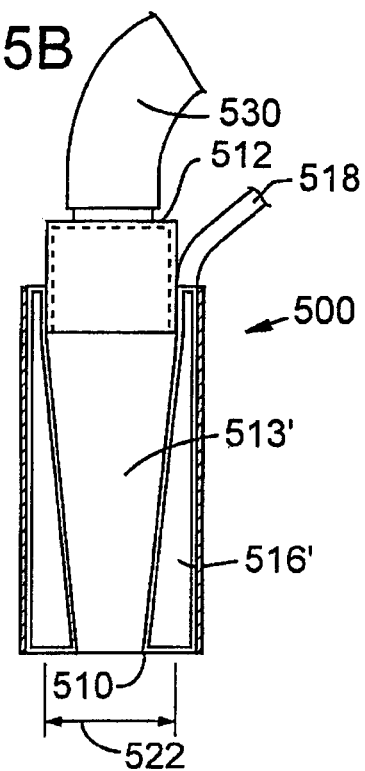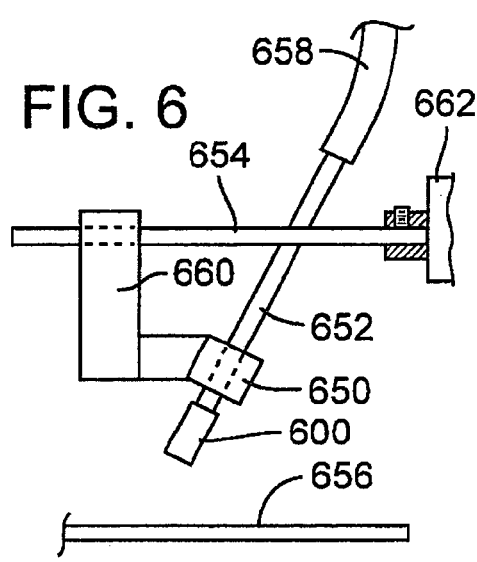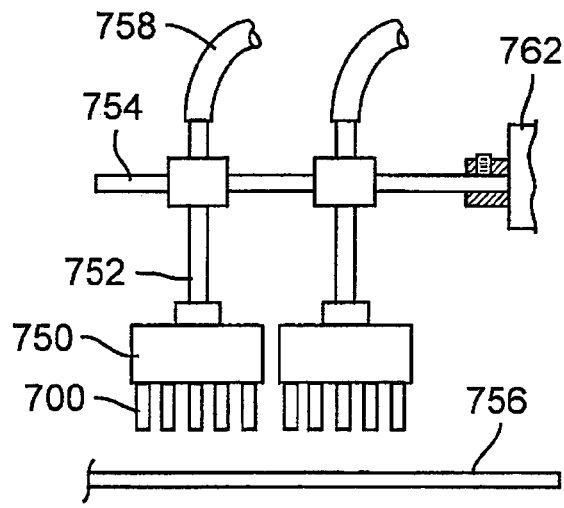

DRIP RESISTANT DISPENSING NOZZLE

FIELD OF THE INVENTION

Disclosed embodiments of the invention relate to the fields of substrates and integrated circuit manufacturing. More specifically, disclosed embodiments of the invention relate to dispensing nozzles that reduce the tendency of the nozzle to drip fluid when not dispensing.

BACKGROUND

In integrated circuit (such as microprocessor) fabrication process, a substrate, typically a silicon based wafer, goes through a number of processing steps in order to manufacture completed integrated circuits. Some of these steps include, but are not limited to, oxidation, circuit patterning, chemical etching, and metal deposition. One process, photolithography, is often used to transfer the pattern representing the circuit components onto the surface of the substrate.

In the photolithography process, a photo resist material is often deposited on the surface of the substrate. A mask is then placed over the substrate, often in the form of a patterned reticle or other pattern medium. An exposing source, such as light, passes through the pattern mask and exposes certain portions of the photo resist to create a particular desired circuit pattern. The exposed portion is then removed from the substrate using a developer solution.

The developer solution is typically dispensed across the surface of the substrate and allowed to briefly stand on the substrate in order to remove the exposed photo resist. The developer solution and the exposed photo resist are then removed from the substrate with a rinse solution, such as de-ionized water. Once completed, the substrate is ready for the next step in the process, which may be, for example, the etching process.

One technique often used to dispense and remove developer and the rinse solution is to slowly rotate the substrate and dispense, via a nozzle, the developer solution on the center of the substrate. The fluid may then radially distributes across the surface of the substrate. Once the developer has completed its reaction time with the exposed photo resist, the substrate is spun at a much higher revolutions per minute RPM such that the developer and exposed photo resist are spun off the substrate. The de-ionized water solution is then similarly dispensed and spun off to insure the exposed photo resist and developer are removed from the surface of the substrate.

A significant problem exists with dispensing the developer and rinse solution onto the substrate using the current dispensing nozzles. Due to the relatively low viscosity and low surface tension of the developer and even lower viscosity and surface tension of the rinse solution, a drip from the nozzle will often occur after the developer or the rinse solution has been stopped and before an arm carrying the nozzle is able to move the nozzle away from the substrate. Because of the delicate and unprotected state of the integrated circuits, drips on the substrate are very undesirable. Drips may cause fatal defects in the patterning of the integrated circuit directly hit by the drip as well as those in close proximity.

BRIEF DESCRIPTION OF THE DRAWINGS

The invention is illustrated by way of example and not by way of limitation in the figures of the accompanying drawings, in which the like references indicate similar elements and in which:

FIG. 1A illustrates a top cross-sectional view of a dispensing nozzle in accordance with an embodiment of the present invention, where the nozzle is in a dispensing configuration;

FIG. 1B illustrates an end cross-sectional view of the dispensing nozzle of FIG. 1A in accordance with an embodiment of the present invention;

FIG. 2A illustrates a top cross-sectional view of a dispensing nozzle in accordance with an embodiment of the present invention, where the nozzle is in a non-dispensing configuration;

FIG. 2B illustrates an end cross-sectional view of the dispensing nozzle of FIG. 2A in accordance with an embodiment of the present invention;

FIG. 3A illustrates a top cross-sectional view of a dispensing nozzle in accordance with an embodiment of the present invention, where the nozzle is in a dispensing configuration;

FIG. 3B illustrates an end cross-sectional view of the dispensing nozzle of FIG. 3A in accordance with an embodiment of the present invention;

FIG. 4A illustrates a top cross-sectional view of a dispensing nozzle in accordance with an embodiment of the present invention, where the nozzle is in a non-dispensing configuration;

FIG. 4B illustrates an end cross-sectional view of the dispensing nozzle of FIG. 4A in accordance with an embodiment of the present invention;

FIG. 5A illustrates a top cross-sectional view of a dispensing nozzle in accordance with an embodiment of the present invention, where the nozzle is in a dispensing configuration;

FIG. 5B illustrates a top cross-sectional view of a dispensing nozzle in accordance with an embodiment of the present invention, where the nozzle is in a non-dispensing configuration;

FIG. 6 illustrates a side view of a rinse process in accordance with an embodiment of the present invention;

FIG. 7 illustrates a side view of a developer solution application process in accordance with an embodiment of the present invention.

DETAILED DESCRIPTION OF EMBODIMENTS OF THE INVENTION

Figure 8:
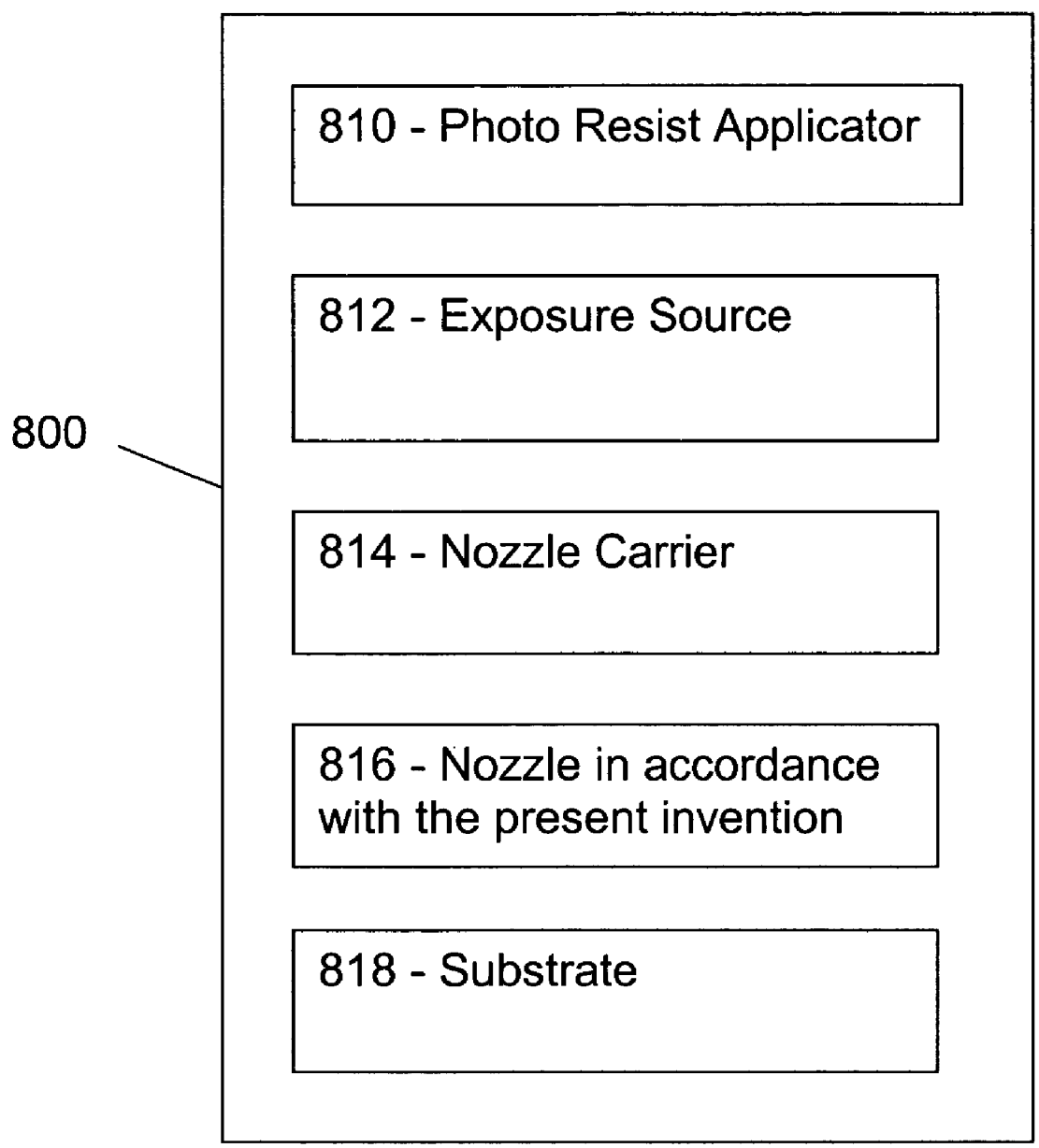
FIG. 8 illustrates a photolithography system in accordance with an embodiment of the present invention.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

FIGS. 1A–1B illustrate a top and an end cross-sectional view of a dispensing nozzle in accordance with an embodiment of the present invention, respectively. Dispensing nozzle 100 is configured to dispense fluid from a fluid source in a controlled fashion. Fluid flows from a first end 112, which may be sometimes referred to as the intake end, through cavity 113 and out a second end 110, also referred to as the dispensing end. Cavity 113 may be defined by the inner wall portion 115 of the nozzle body 114. Nozzle body 114 may be at least partially constructed of a substantially flexible material to allow the nozzle diameter to increase and decrease. Suitable substantially flexible materials include, but are not limited polyethylene, polypropylene, latex based materials and the like.

Flow directional arrow 124 indicates this movement of fluid from the first end 112 through cavity 113 to the second end 110. As shown, second end 110 is in the dispensing configuration and has a dispensing or first diameter 122, that allows fluid, such as a developer solution or de-ionized water, to be dispensed onto a substrate being processed. When the fluid source is activated (e.g. turned on or a valve (not shown) is actuated) fluid is dispensed through second end 110. When the source is deactivated, nozzle 100 stops dispensing, but leaves a certain amount of fluid, sometimes referred to as standing fluid, in cavity 113. It is during the time between when the nozzle stops dispensing and the time the nozzle is moved away from the substrate (or a new substrate is positioned) that a drip is likely to fall on the treated substrate. The standing fluid has a tendency to drip in part because the gravity acting on the standing fluid overcomes the lower surface tension of the fluid, forcing it to drip from second end 110.

To resist this tendency to drip, capillaries 116 may be partially or completely disposed within the nozzle body 114. Capillaries 116 may extend along a portion of the nozzle body to a designated point at or near second end 110. Capillaries 116 are configured to couple to a pressure control source upstream from capillary inlet 118. The pressure control source may be a pump, for example, capable of creating a positive or negative pressure (i.e. a vacuum). By creating a vacuum, for example, the capillaries may constrict, which may cause the substantially flexible nozzle to also constrict.

FIGS. 2A–2B illustrate a top and a side cross sectional view of a dispensing nozzle in accordance with embodiment of the present invention, respectively, where the nozzle is in the non-dispensing configuration. When the fluid source is deactivated or cut off, the pressure control source may create a vacuum, which may cause capillaries 216 to constrict or shrink in diameter. Constriction of capillaries 216 in turn may cause the inner diameter 226 of second end 210 to decrease into a nondispensing configuration (as compared to dispensing diameter 122 in FIG. 1A). This decrease in diameter 226 may help resist the tendency of the fluid to drip once the fluid source is cut off, and is particularly useful for fluids having a lower surface tension.

Reducing diameter 226 decreases the area of the first end 210 that the standing fluid in nozzle cavity 213 must pass through to drip. This effectively decreases the area of the potential drip and results in a higher surface tension per opening area. Thus even a slight decrease in diameter 226 results in a greater resistance of the standing fluid to drip once the fluid source is deactivated. This resistance to drippage may allow time for the nozzle to be moved from a position above the substrate, or may allow time for a new substrate to be positioned for processing without dripping.

A comparison of FIG. 1B with FIG. 2B illustrates the reduction in the diameter 122 of dispensing end 110 in the dispensing configuration to the non-dispensing configuration, where capillaries 216 have constricted and second end 210 has decreased to diameter 226. The slight reduction in diameter from 122 to 226 will likely allow the nozzle, once the fluid source is cut off, to resist the tendency to drip standing fluid for a longer period of time.

FIG. 3A illustrates a cross sectional view of a dispensing nozzle in accordance with an embodiment of the present invention. Nozzle 300 is in a dispensing configuration, having an intake first end 312 configured to couple to a fluid source and a dispensing second end 310 for dispensing fluid as shown by directional arrow 324. Nozzle body 314 has an inner portion 315 that defines cavity 313 and outer portion 317. Capillaries 316 are disposed within body 314 in an annular fashion. Capillaries 316 are configured to couple to a pressure control source (not shown) through passage 318 disposed within the nozzle body 314. The individual annular capillaries 316 may also be configured to independently couple to the pressure control source without using passage 318.

FIG. 4A illustrates a top cross sectional view of a dispensing nozzle in accordance with an embodiment of the present invention in a nondispensing configuration. Capillaries 416 are annularly disposed in nozzle body 414 toward the second end 410. When the fluid source has been cut off from first end 412 such that no fluid is flowing through nozzle cavity 413, a pressure control source (not shown) may create a vacuum in capillaries 416, which are coupled to the pressure control source through passage 418. The negative pressure causes the capillaries 416 to constrict, which in turn causes second end 410 to decrease in diameter 426. This decrease in diameter may help nozzle 400 to resist the tendency to drip fluid for a longer period when the control source is cut off from the nozzle.

FIGS. 3B and 4B together illustrate the decrease in diameter 322 to 426 when the pressure control source creates a vacuum, thereby constricting capillaries 316 down to those capillaries 416.

Though the capillaries described in the embodiments discussed above run in either the longitudinal direction (FIGS. 1–2) or an annular fashion (FIGS. 3–4), it can be appreciated that other configurations are possible to reduce the nozzle diameter, including, but not limited to capillaries positioned in a helical fashion. Further, the entire nozzle body needs not be made of such flexible or pliable material. For example, the interior wall portion may be pliable such that the inner diameter may decrease without the overall diameter of the nozzle decreasing. Or, the lower portion of the nozzle body near the dispensing end may be more pliable such that it reduces in diameter where the upper portion does not.

It can also be appreciated by one of skill in the art that the pressure control source may also increase the pressure thereby expanding the capillaries of the above described embodiments to decrease the inner diameter of the nozzle. FIGS. 5 and 5A also illustrate cross sectional views of a nozzle in accordance with an embodiment of the present invention, where a positive pressure is applied to reduce the nozzle diameter.

FIG. 5A shows a dispensing nozzle 500 in a dispensing configuration in accordance with an embodiment of the present invention. First end 112 of nozzle 500 is coupled to a fluid infeed line 530, which is coupled to a fluid source (not shown). An inflatable bladder 516 surrounds the cavity 513 portion of the nozzle 500. Bladder 516 is coupled to a pressure control source via line 518. Second end 510 is in the dispensing configuration having diameter 522. Bladder 516 is in a substantially noninflated state, thereby allowing the nozzle to be in a dispensing configuration.

FIG. 5B illustrates nozzle 500 in the nondispensing configuration in accordance with an embodiment of the present invention. When the fluid source is cut off, the pressure control source inflates bladder 516'. Semi-rigid sleeve 519 surrounds the outer portion of bladder 516' to prevent the bladder from expanding radially outward when inflated. By expanding inward, bladder 516' causes the nozzle cavity 513 to decrease in diameter at the second end 510. As discussed above, the decrease in diameter shown by 522', may help prevent any of the standing fluid in cavity 513 to resist dripping for a longer period of time. Semi-rigid sleeve 519 is not necessary, as the bladder may be designed to resist outward expansion, or the outward expansion may be acceptable if there is also inward expansion.

It can be appreciated that the bladder need not extend longitudinally the length of the nozzle, but may simply be a short portion located toward the second end to accomplish the same result. Further, though the example embodiments described herein require the pressure control source to either increase or decrease pressure to decrease the diameter of the dispensing end, it can be appreciated that the nozzle may be configured to be in the non-dispensing configuration in its neutral state. Where this is the case, the pressure control source may constrict the capillaries, for example, in order to enlarge the diameter of the dispensing end.

FIGS. 6 and 7 illustrate cross sectional views of dispensing nozzles in accordance with embodiments of the present invention. FIG. 6 illustrates the de-ionized rinse process, where the developer solution is washed off a substrate. Rotatable arm 654 carries nozzle 600 through support 660 and linkage 650. Nozzle 600 is coupled to a fluid source of de-ionized water (not shown). When dispensing fluid onto substrate 656, nozzle 600 may be positioned above the substrate 656 in the dispensing configuration.

When the rinse is sufficiently complete, the fluid source is cut off and the nozzle is placed in the nondispensing configuration by a pressure control source increasing or decreasing the pressure in the capillaries, inflating the bladder, or modify the pressure of another control mechanism to cause the dispensing end of the nozzle to decrease in diameter. This in turn may help the de-ionized water standing in the nozzle 600 to resist dripping as the rotatable arm moves the nozzle away from a position above the substrate 656.

FIG. 7 illustrates the developer solution dispensing process. Rotatable arm 754 is coupled to nozzle carrier 750, which in turn have multiple nozzles 700 coupled thereto. Conduit 752 is coupled to a fluid source of developer solution (not shown) through line 758. When dispensing fluid onto substrate 756, nozzles 700 may be positioned above the substrate 756 in the dispensing configuration.

When the appropriate amount of developer solution is dispersed on substrate 756, the fluid source is cut off and the nozzles 700 may be placed in the nondispensing configuration. This is accomplished by a pressure control source 762 increasing or decreasing the pressure in the capillaries, inflating the bladder, or modifying the pressure in other control mechanisms to cause the second end to decrease in diameter. This in turn may help the developer solution remaining in nozzles 700 to resist dripping as the rotatable arm 754 moves the nozzle carriers 750 away from a position above the substrate 656.

FIG. 8 illustrates a photolithography system in accordance with an embodiment of the present invention. Photolithography system 800 includes a photo resist applicator 810 for applying photo resist material to a substrate 818. An exposure source 812 may be used for exposing the photo resist through a patterned mask. A nozzle carrier 814 carries at least one nozzle 816, which is a drip resistant nozzle of the present invention. The nozzle 816 may dispense fluid such as developer solution and/or de-ionized water rinse on the substrate 818 to remove any exposed photo resist.

Though the nozzles described with respect to the various embodiments of the present invention have been presented as being useful in the photolithography process, it is contemplated that the nozzles may be used for any fluid and in any situation where resistance to drippage is needed, especially when using low viscosity fluids having low surface tension.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A dispensing nozzle, comprising:
    a substantially flexible body, the body having a first end, a second end, a wall having an inner portion and an outer portion, the inner portion defining an interior cavity, and a plurality of capillaries disposed on the exterior portion;
    wherein the first end is configured to coupled the nozzle to a fluid source to accept a fluid into the interior cavity, the second end is configured to dispense the received fluid,
    the capillaries are configured to couple the nozzle to a pressure control source to selectively affect a pressure change partially or completely within the wall, and
    the wall is configured to reduce at least a portion of the interior cavity in volume responsive to the pressure change.

2. The nozzle of claim 1, wherein the capillaries extend longitudinally along a substantial portion of the body.

3. The nozzle of claim 1, wherein the capillaries extend annularly along a portion of the body.

4. The nozzle of claim 1, wherein the capillaries extend helically along a portion of the body.

5. The nozzle of claim 1, wherein the fluid source is selected from the group including a developer solution or de-ionized water.

6. The nozzle of claim 1, wherein the pressure change is caused by a pump.

7. A photolithography system, comprising:
    a photoresist applicator;
    an exposure source coupled to the photoresist applicator;
    a nozzle carrier coupled to the photoresist applicator; and
    a dispensing nozzle coupled to the nozzle carrier, the dispensing nozzle comprising:
        a substantially flexible body, the body having a first end configured to couple to a fluid source, a second end configured to dispense fluid, and an interior cavity, the interior cavity configured to allow at least a portion of the interior cavity to decrease in diameter in response to a pressure change.

8. The system of claim 7, wherein the substantially flexible body includes a plurality of capillaries, the capillaries configured to couple to a pressure control source.

9. The system of claim 8, wherein the capillaries extend longitudinally along a substantial portion of the body.

10. The system of claim 8, wherein the capillaries extend annularly along a portion of the body.

11. The system of claim 8, wherein the capillaries extend helically along a portion of the body.

12. The nozzle of claims 8, wherein the fluid source is selected from the group including a developer solution or deionized water.

13. The system of claim 7, wherein the substantially flexible body includes an inflatable bladder disposed about a portion of the body, the bladder configured to couple to a pressure control source.

14. The system of claim 13, wherein the inflatable bladder extends along a substantial portion of the body.

15. The system of claim 13, wherein a substantially inflexible sleeve surrounds the inflatable bladder to prevent radial expansion of the bladder.

16. The nozzle of claims 13, wherein the fluid source is selected from the group including a developer solution or de-ionized water.

17. The nozzle of claim 7, wherein the pressure change is caused by a pump.

18. A method for dispensing fluid in a photolithography process, comprising:
    providing a nozzle having:
        a substantially flexible body, the body having a first end, a second end, a wall having an inner portion and an outer portion, the inner portion defining an interior cavity, and a plurality of capillaries disposed on the exterior portion;
    wherein the first end is configured to couple the nozzle to a fluid source to accept a fluid into the interior cavity,
    the second end is configured to dispense the received fluid, the capillaries are configured to couple the nozzle to a pressure control source to selectively affect a pressure change partially or completely within the wall, and
    the wall is configured to reduce at least a portion of the interior cavity in volume responsive to the pressure change;
    coupling the first end to a fluid source having a fluid selected from a group consisting of a photoresist, a developer solution, a rinse solution, and water; and
    decreasing the diameter of a portion of the interior cavity at the second end by changing the pressure to dispense the selected fluid.

19. The method of claim 18, wherein decreasing the second end includes decreasing the pressure in the capillaries to cause the capillaries to constrict.

* * * * *